United States Patent [19]

Williams

[11] Patent Number: 5,883,607
[45] Date of Patent: Mar. 16, 1999

[54] COMPUTERS COMPRISING SCRATCH RESISTANT OPTICAL FILMS

[75] Inventor: Todd R. Williams, Lake Elmo, Minn.

[73] Assignee: Minnesota Mining and Manufacturing Company, St. Paul, Minn.

[21] Appl. No.: 961,979

[22] Filed: Oct. 31, 1997

Related U.S. Application Data

[62] Division of Ser. No. 783,083, Jan. 15, 1997, Pat. No. 5,716,681, which is a division of Ser. No. 382,982, Feb. 3, 1995, Pat. No. 5,635,278.

[51] Int. Cl.$^6$ ........................................... G09G 3/28
[52] U.S. Cl. ........................ 345/32; 345/87; 362/330; 428/1; 349/64
[58] Field of Search ........................ 364/400; 345/32, 345/84, 87, 112, 418; 362/330; 428/1, 172; 349/64; 359/455, 599, 837

[56] References Cited

U.S. PATENT DOCUMENTS

| 4,262,072 | 4/1981 | Wendling et al. ........................ 430/14 |
| 4,340,276 | 7/1982 | Maffitt et al. ........................... 350/164 |
| 4,542,449 | 9/1985 | Whitehead ............................... 362/330 |
| 5,120,569 | 6/1992 | Zupancic et al. ...................... 427/43.1 |
| 5,175,030 | 12/1992 | Lu et al. .................................. 428/30 |
| 5,183,597 | 2/1993 | Lu ............................................ 264/1.4 |
| 5,196,266 | 3/1993 | Lu et al. .................................. 428/355 |
| 5,316,849 | 5/1994 | Lu et al. .................................. 428/355 |

FOREIGN PATENT DOCUMENTS

| 0 528 645 A2 | 2/1993 | European Pat. Off. . |
| 31 40317 A1 | 4/1983 | Germany . |
| WO 92/17337 | of 1992 | WIPO . |

OTHER PUBLICATIONS

ASTM D–882–91, "Standard Test Methods for Tensile Properties of Thin Plastic Sheeting".
ASTM D–968–81, "Standard Test Methods for Abrasion Resistance of Orgasnic Coatings by Falling Abrasive".
Derwent Patent Abstract, SectionCH, Week 8512, Derwent Publications Ltd., London, GB, Class A32, AN 85–071606 XP002004064 & JP A 60 025 710, Feb. 1985.

Primary Examiner—Donald Loney
Attorney, Agent, or Firm—Robert H. Jordan

[57] ABSTRACT

A film that exhibits increased scratch resistant characteristics. The film is formed from a layer of crosslinkable oligomeric resin composition on a base. The film is made by: forming the layer of crosslinkable oligomeric resin composition on the base, and curing the resin composition to an extent that the film exhibits a haze decrease of less than or equal to 60 percent after abrading according to the ASTM D-968-81 procedure using 200 milliliters of sand. Preferably, the layer has a microstructure of alternating tips and grooves. Such films are useful in backlit displays which are useful in computers and the like.

8 Claims, 2 Drawing Sheets

COMPUTERS COMPRISING SCRATCH RESISTANT OPTICAL FILMS

CROSS-REFERENCE TO RELATED APPLICATIONS

This application is a division of U.S. application Ser. No. 08/783,083, filed Jan. 15, 1997, now U.S. Pat. No. 5,716,681, which was a division of U.S. application Ser. No. 08/382,982, filed Feb. 3, 1995, now U.S. Pat. No. 5,635,278.

BACKGROUND OF THE INVENTION

The present invention relates generally to a method of producing a microstructure bearing composite article that exhibits superior scratch resistance qualities. More particularly, the present invention relates to a method of increasing scratch resistance of a brightness enhancement film or an optical lighting film.

The geometrical features and use of microstructure bearing articles as a brightness enhancement film are shown in Whitehead, U.S. Pat. No. 4,542,449. Other examples of microstructure bearing articles, which are useful as brightness enhancement films, include Lu et al., U.S. Pat. No. 5,175,030, and Lu, U.S. Pat. No. 5,183,597. These patents disclose microstructure bearing composite articles and a method of molding the microstnicture bearing composite articles. The Lu et al. patent and the Lu patent address forming the microstructure so as to exhibit desired optical properties, such as total internal reflection.

Microstructure bearing articles are made in a variety of forms. One such form includes a series of alternating tips and grooves. One example of such a form is brightness enhancement film, which has a regular repeating pattern of symmetrical tips and grooves. Other examples include patterns in which the tips and grooves are not symmetrical and in which the size, orientation, or distance between the tips and grooves is not uniform. When the included angle of the grooves is in the range of about 70° to about 120° and especially in the range of about 80° to about 100°, the article with alternating tips and grooves is useful as a brightness enhancement film.

One major drawback of prior art radiation-cured brightness enhancement films and optical lighting films is that the tips of the microstructure are susceptible to mechanical damage. For example, light scraping with a fingernail or other hard, relatively sharp edge can cause the tips of the microstructure to break. Conditions sufficient to break the tips of prior art microstructures are typically experienced during normal handling of brightness enhancement films in the manufacturing of liquid crystal displays for lap-top computers.

When microstructure peaks are broken, the reflective properties of the affected peaks are reduced and the transmitted light scattered to virtually all forward angles. Hence, when the brightness enhancement film is in a display, and the display is viewed straight on, scratches in the brightness enhancement film are less bright than the surrounding, undamaged area of the film. However, when the display is viewed at an angle near or greater than the "cutoff" angle, the angle at which the image on the display is no longer viewable, the scratches look substantially brighter than the surrounding, undamaged area of the film. In both situations, the scratches are very objectionable from a cosmetic standpoint, and brightness enhancement film with more than a very few, minor scratches is unacceptable for use in a liquid crystal display.

Prior art brightness enhancement films include "Brightness Enhancement Film", a version made from polycarbonate thermoplastic, sold by Minnesota Mining and Manufacturing Company, St. Paul, Minn. and "DIAART" a version made of a radiation cured microstructured layer on a polyester base, sold by Mitsubishi Rayon, Tokyo, Japan. Both of these versions are not as scratch resistant as desired.

SUMMARY OF THE INVENTION

The present invention provides a method of producing an optical film that exhibits increased scratch resistance characteristics. The film has a layer formed from a crosslinkable oligomeric resin composition disposed on a base. Preferably, the layer has a microstructure of alternating tips and grooves. The present invention also provides backlit displays comprising such films and computers comprising such displays.

The method includes the steps of: forming the crosslinkable oligomeric resin composition on the base, and curing the resin composition. The film thereby produced exhibits a haze increase of less than or equal to 60 percent after abrading according to the ASTM D-968-81 procedure using 200 milligrams of sand.

These figures, which are not to scale, are intended to be merely illustrative and non-limiting.

DETAILED DESCRIPTION OF ILLUSTRATIVE EMBODIMENTS

The present invention provides a method of producing a microstructure bearing polymeric article having alternating grooves and tips on a base or substrate that exhibits an increased resistance to scratching. The terms "base" and "substrate" are used interchangeably herein. The method according to the present invention provides for the formation of a microstructure bearing article that resists scratching when used as a brightness enhancement film or as an optical lighting film.

Figure 1:
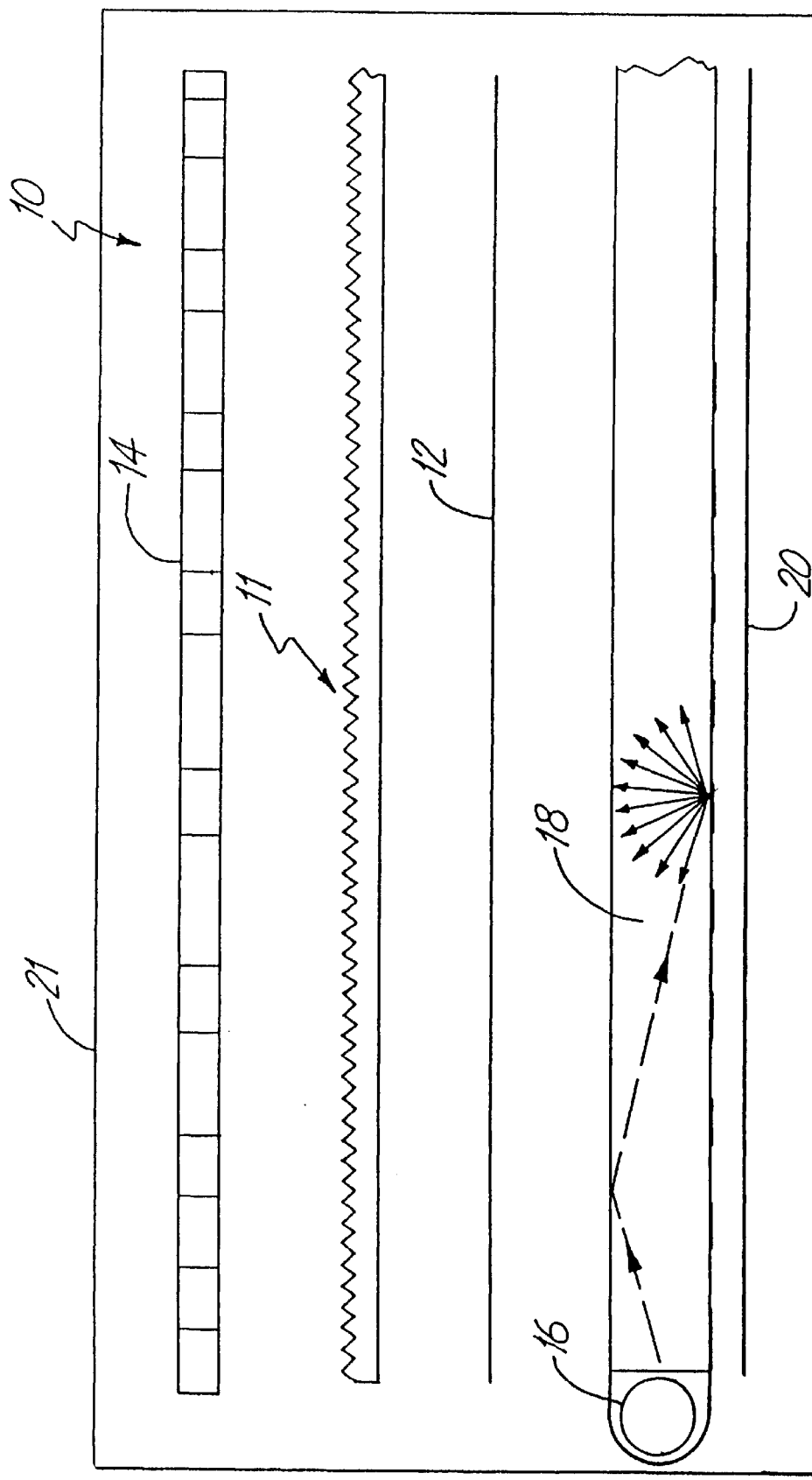
FIG. 1 is a schematic view of an illustrative film of the present invention in a backlit liquid crystal display.
Figure 2:
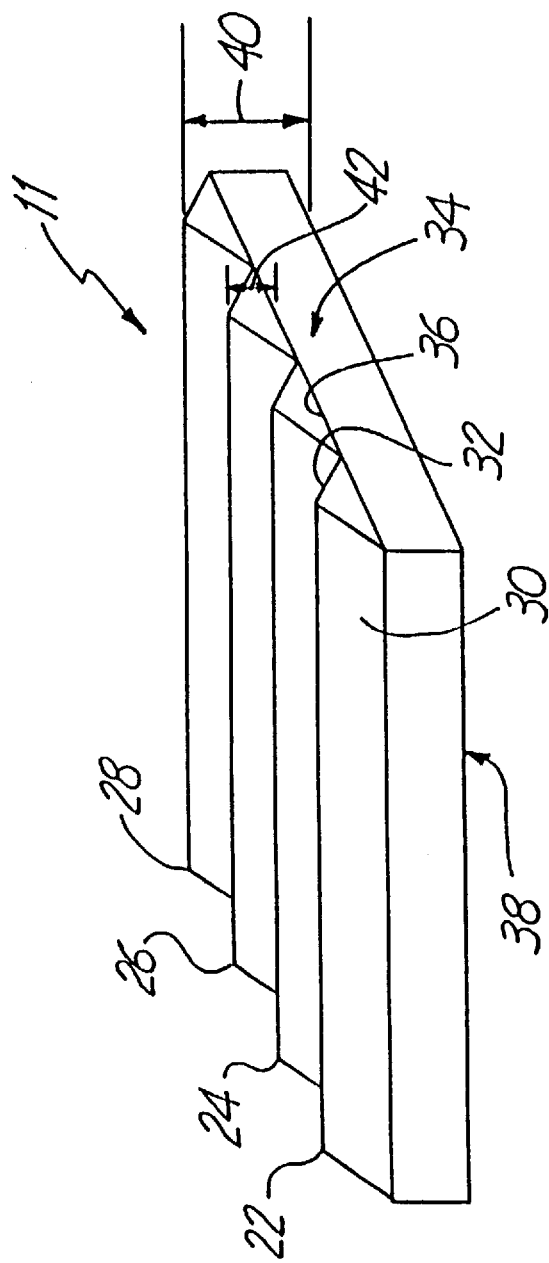
FIG. 2 is a perspective view of an illustrative microstructure bearing polymeric article of the present invention.

A backlit liquid crystal display generally indicated at 10 in FIG. 1 includes a brightness enhancement film 11 of the present invention which is typically positioned between a diffuser 12 and a liquid crystal display panel 14. The backlit liquid crystal display also includes a light source 16 such as a fluorescent lamp, a light guide 18 for transporting light for reflection toward the liquid crystal display panel 14, and a white reflector 20 for reflecting light also toward the liquid crystal display panel. The brightness enhancement film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancement film 11 in the backlit liquid crystal display is useful in equipment such as computers, personal televisions, video recorders, mobile communication devices, and automobile and avionic instrument displays, represented by reference character 21. The brightness enhancement film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 are formed on a body portion 34 that has a first surface 36 on which the prisms are formed and a second surface 38 that is substantially flat or planar and opposite the first surface.

A linear array of regular right prisms is preferred for both optical performance and ease of manufacture. By right prisms, it is meant that the apex angle θ is typically 90°, but can also range from approximately 70° to 120° and most preferably from approximately 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. A typical ratio of prism height 42 to total thickness 40 is generally between 25/125 and 2/125.

The angle that the facets would form with the surface 38 if the facets were to be projected would typically be 45°. However, this angle would vary depending on the pitch of the facet or the angle θ of the apex.

It has been discovered that degraded cosmetic optical quality seen with previously known brightness enhancement films and optical lighting films was caused at least in part by broken microstructure tips. The broken tips cause a higher proportion of light to be transmitted diffusely, resulting in cosmetically unacceptable, bright defects visible against an otherwise dark background of the brightness enhancement film near or outside the cutoff angle. When a brightness enhancement film has a large proportion of its groove tips broken in a given area, the optical performance of that area can be characterized by the ratio of the light transmitted diffusely by the microstructure bearing article to the light transmitted with its original collimation. This ratio is commonly referred to as the haze of the film.

It has also been found that the more scratch resistant the microstructure bearing article is, the less the haze increases when the microstructure bearing article is abrasion tested. In particular, it has been found that when the abrasion testing results in a haze increase of less than or equal to 60 percent, the microstructure bearing article exhibits advantageous scratch resistant characteristics. Even more desirable scratch resistant characteristics are exhibited when the abrasion testing causes the haze of the microstructure bearing article to increase less than 40 percent.

The microstructure bearing article is preferably formed according to a process similar to the processes disclosed in Lu et al., U.S. Pat. No. 5,175,030, and Lu, U.S. Pat. No. 5,183,597. The formation process preferably includes the following steps:

(a) preparing an oligomeric resin composition;
(b) depositing the oligomeric resin composition onto a master negative microstructured molding surface in an amount barely sufficient to fill the cavities of the master;
(c) filling the cavities by moving a bead of the composition between a preformed substrate and the master, at least one of which is flexible, the composition forming alternating tips and grooves; and
(d) curing the oligomeric composition that forms the tips and grooves.

The oligomeric resin composition of step (a) is a one-part, solvent-free, radiation-polymerizable, crosslinkable, organic oligomeric composition. Key criteria in selecting an oligomer are flexibility of the cured resin and refractive index.

The oligomeric composition is preferably formed from a soft resin. The term "soft resin" means that the resulting polymer exhibits an elongation at break of greater than 50 percent when evaluated according to the ASTM D-882-91 procedure. The soft resin polymer also preferably exhibits a tensile modulus of less than 100 kpsi ($6.89 \times 10^8$ pascals) when evaluated according to the ASTM D-882-91 procedure.

Hard resins, on the other hand, are less preferable for use in the present invention because microstructures formed from hard resins are readily scratched or broken. The term "hard resin" means that the resulting polymer exhibits an elongation at break of less than 50 percent and a tensile modulus of greater than 100 kpsi ($6.89 \times 10^8$ pascals).

For brightness enhancement films, high refractive index is beneficial to optical performance. The oligomeric composition of the present invention also preferably provides a cured polymer having a high refractive index, that is a refractive index above approximately 1.56.

One preferred suitable oligomeric composition is a blend of polythioether and one or more reactive diluents, which are used to control the viscosity of the composition. Preferably, the reactive diluents include at least one acrylate ester containing an aromatic group. This combination provides a cured resin with an acceptable combination of resin flexibility and high refractive index.

In a preferred oligomeric resin composition, the polythioether is between about 40 and 80 percent by weight and preferably between 45 and 55 percent by weight and most preferably about 50 percent by weight of the oligomeric composition. The reactive diluent is between about 20 and 60 percent by weight and preferably between 45 and 55 percent by weight and most preferably about 50 percent by weight of the oligomeric composition.

The polythioether can be chosen from a number of such compounds such as acrylate terminated polythioether oligomers, and acrylated liquid polysulfide oligomers. The acrylic terminated oligomers are derived from commercially available hydroxyl terminated oligomers such as the "PERMAPOL" designated products from Products Research & Chemical Corporation of Glendale, Calif. Other acrylate terminated oligomers can be purchased directly or derived from products purchased from Morton International of Chicago, Ill.

The oligomeric compositions may also include a urethane acrylate oligomer based material along with one or more reactive diluents, which are used to control viscosity of the composition. If used, the reactive diluents preferably have at least one acrylate ester containing an aromatic group.

Another alternative oligomeric resin composition includes a polyether-based urethane acrylate oligomer. The polyether based urethane acrylate oligomer can be used without the addition of reactive diluents. The polyether-based urethane acrylate oligomer is preferably PHOTOMER Brand 6010, which can be obtained from Henkel Corporation of Ambler, Pa.

Another preferred oligomeric resin composition includes polyester based urethane acrylate oligomer, which is between about 65 and 85 percent by weight and preferably about approximately 75 percent by weight of the oligomeric composition. The polyester based urethane acrylate oligomer is preferably SARTOMER Brand 9503, which can be obtained from the Sartomer Company of Exton, Pa.

The reactive diluent in this oligomeric resin composition is between about 15 and 35 percent by weight and preferably about approximately 25 percent by weight of the oligomeric composition. The reactive diluent for this embodiment includes iso-octyl acrylate and N-iso-butoxymethyl methacrylamide. Preferably, the iso-octyl acrylate is about approximately 15 percent by weight of the oligomeric composition and the N-iso-butoxymethyl methacrylamide is about approximately 10 percent by weight of the oligomeric composition.

Another composition that is suitable for use in the present invention includes an oligomer and iso-octyl acrylate. The oligomer is preferably PHOTOMER Brand 6010, which can be obtained from Henkel Corporation of Ambler, Pa. The PHOTOMER Brand 6010 is between 70 and 90 percent by weight of the composition and preferably approximately 80 percent by weight of the composition. The iso-octyl acrylate is between 10 and 30 percent of the composition and preferably approximately 20 percent by weight of the composition.

Still another composition that is suitable for use in the present invention includes an oligomer that is disclosed in Example 1 of U.S. Pat. No. 5,175,030, iso-octyl acrylate, N-vinyl caprolactam, hexandiol diacrylate. The oligomer disclosed in Example 1 of U.S. Pat. No. 5,175,030 is between 50 and 60 percent by weight of the composition and preferably approximately 54 percent by weight of the composition. The iso-octyl acrylate is between 10 and 20 percent by weight of the composition and preferably approximately 15 percent by weight of the composition. The N-vinyl caprolactam is between 10 and 20 percent by weight of the composition and preferably approximately 15 percent by weight of the composition. The hexandiol diacrylate is between 10 and 20 percent by weight of the composition and preferably approximately 15 percent by weight of the composition. The photoinitiator used for this composition was IRGACURE Brand 184, which can be obtained from Ciba-Geigy Corporation of Hawthorne, N.Y. The IRGACURE is approximately 1 percent by weight of the composition.

In addition, a crosslinking agent may be added to the resin to further aid in the crosslinking of the polymer. However, if used, the concentration of the crosslinking agents must be carefully controlled so that the crosslinking agent does not cause the resin to become hard. Illustrative examples of suitable crosslinking agents include 1,4-butylene di-methacrylate or -acrylate; ethylene di-methacrylate or -acrylate; trimethylolpropane di- or tri-acrylate or di- or tri-methacrylate; glyceryl di-acrylate or -methacrylate; glyceryl tri-acrylate or -methacrylate; glycidyl acrylate or methacrylate; pentaerythritol tri- or tetra-acrylate or tri- or tetra-methacrylate; diallyl phthalate; 2,2-bis(4-methacryloxyphenyl)-propane; diallyl adipate; di(2-acryloxyethyl) ether; dipentaerythritol pentacrylate; neopentyl glycol diacrylate; polypropylene glycol diacrylate or dimethacrylate; 1,3,5-tri-(2-(meth)acryloxyethyl)-s-triazine; hexamethylene diacrylate; poly(ethylenically unsaturated alkoxy) heterocycles, as taught in U.S. Pat. No. 4,262,072; and adducts of poly(isocyanates) with hydroxy- and amino-functional acrylates, such as EB 220 sold by UCB-Radcure of Smyrna, Ga. Crosslinking agents that result in a polymer with a high refractive index are preferred. Preferably the refractive index is greater than 1.56 and most preferably the refractive index is greater than 1.58. One such crosslinking agent, which is especially useful, is EB 220.

Polymerization can be accomplished by usual means, such as heating in the presence of free radical initiators, irradiation with ultraviolet or visible light in the presence of suitable photoinitiators, and by irradiation with electron beams. For reasons of convenience, low capital investment, and production speed, the preferred method of polymerization is by irradiation with ultraviolet or visible light in the presence of a photoinitiator at a concentration of about 0.1 percent to about 1.0 percent by weight of the oligomeric composition. Higher concentrations can be used but are not normally needed to obtain the desired cured resin properties.

In the prior discussion, the exact amounts of oligomer (for example, polythioether, polyether-based or polyester-based urethane acrylate), reactive diluent(s), and crosslinker(s) to be used in any given situation will depend on a desired viscosity of the oligomeric composition and a desired refractive index of the cured resin. If the amount of polythioether is too high, the oligomeric composition has a viscosity too high for easy handling, although heating the composition significantly above ambient will lower the viscosity somewhat. If the amount of reactive diluent is too high, the cured resin will have a refractive index that is too low and will not be flexible enough to exhibit scratch resistant properties. If the amount of crosslinker is too high, the resulting cured resin may not be flexible enough to show scratch resistant properties.

When polythioether resins are used in the crosslinkable oligomeric resin composition, the following procedure is performed prior to forming the microstructure. The polythioether is mixed with vinyl dimethyl aziactone from SNPE Incorporated of Princeton, N.J. and diazabicycloundecene in a flask such that the mixture contains 68 percent by weight polythioether, 30 percent by weight vinyl dimethyl azlactone, and 2 percent by weight diazabicycloundecene. The flask is immersed in an oil bath, which is maintained at a temperature of about approximately 65° C.

After approximately four hours, the mixture is analyzed to determine if the azlactone has completely reacted. If the azlactone has not completely reacted after 12 hours, an additional amount of polythioether is added to the mixture. Preferably, the additional amount is equal to 10 percent by weight of the mixture.

Once the azlactone has completely reacted, the reacted polythioether is mixed with one or more reactive diluents. The reactive diluent can be bisphenol-A ethoxylate diacrylate such as PHOTOMER Brand 4028, which can be obtained from Henkel Corporation of Ambler, Pa. In the examples of this disclosure, the polythioether and the reactive diluent are mixed in an one to one ratio. It is anticipated that an optimal ratio would result in the highest refractive index while retaining a usable viscosity.

An ultraviolet radiation initiator is preferably also mixed into the polythioether in an amount that is about approximately 1 percent by weight of the composition. The ultraviolet radiation initiator is preferably DAROCUR Brand 1173, which can be obtained from Ciba-Geigy Corp. of Hawthorne, N.Y. After sufficient mixing to ensure homogeneous mixing of the components, the crosslinkable oligomeric resin composition is ready for use in the formation of the microstructure.

Almost any material can be used for the base, as long as that material is substantially optically clear and has enough strength to allow handling during casting of the microstructure and manufacture of a display assembly in which the microstructure bearing article is used. In addition, the material used for the base should be chosen so that it has sufficient thermostability and resistance to aging so that performance of the display assembly in which the article of the present invention is used is not compromised over its typical lifetime.

Other useful backings for the microstructure bearing articles include cellulose acetate butyrate, cellulose acetate propionate, polyether sulfone, polymethyl methacrylate, and polyurethane. Glass is also useful in certain articles, but does not have the flexibility and toughness available that the polymeric films mentioned above have. The surface of the backing may also be treated to promote adhesion to the oligomeric composition.

Polyethylene terephthalate based materials having good optical qualities and acceptable adhesion are preferred.

Examples of such polyethylene terephthalate based materials include: a photograde polyethylene terephthalate; a polyethylene terephthalate (PET) having a surface that is formed according to the method described in U.S. Pat. No. 4,340,276 (Example 5), referred to herein as "SEP-PET"; and MELINEX PET manufactured by ICI Films of Wilmington, Del. The SEP-PET has a material such as chromium applied in an amount which results in a composite surface on which portions of the underlying PET are exposed between discontinuous microislands of the material. The composite surface is sputter etched with an oxygen plasma to preferentially etch the exposed portions of the higher sputtering rate PET, while the discontinuous microislands are etched at a lower rate, resulting in a topography of micropedestals which vary in height within a range of approximately 0.01 and 0.2 $\mu$m and which are separated from adjacent micropedestals a distance within a range of approximately 0.05 to 0.5 $\mu$m.

For the crosslinkable oligomeric resin compositions, the components are blended until the components are homogeneously distributed. The viscosity of the oligomeric composition deposited in step (b) is preferably between 500 and 5,000 centipoise. If the oligomeric composition has a viscosity above this range, air bubbles might become entrapped in the composition. Additionally, the composition might not completely fill the cavities in the master. When an oligomeric composition with a viscosity below that range is used, the oligomeric composition usually experiences shrinkage upon curing that prevents the oligomeric composition from accurately replicating the master.

Polyethylene terephthalate or polycarbonate film are preferable for use as a substrate in step (c) because the materials are economical, optically clear, and have good tensile strength. Thicknesses of 0.025 millimeters to 0.5 millimeters are preferred and thicknesses of 0.075 millimeters to 0.175 millimeters are especially preferred.

A preferred master for use with the above described method is a metallic master, such as nickel, nickel-plated copper or brass. If the temperature of the heat treating step is not too great, the master can also be constructed from thermoplastic materials, such as a laminate of polyethylene and polypropylene.

After the oligomeric resin composition fills the cavities between the substrate and the master, the oligomeric resin composition is cured.

For selected oligomeric resin compositions, it may be desirable to heat treat the resin after the resin is cured. It also is possible to cure the resin at an elevated temperature. However, if either of the heat treating steps is used, care must be used to avoid substantially raising the glass transition temperature of the resin because raising the glass transition temperature to a point near or above ambient typically results in a decrease in the flexibility of the resin.

A testing method has also been developed to define satisfactory scratch resistance of the brightness enhancement film and optical lighting film of the present invention. The testing method measures the change in haze of the microstructure bearing article from before the microstructure is abraded to after the microstructure is abraded.

The abrasion causes small chips and scratches in the microstructure. As a result of the chips and scratches, a greater proportion of light that is directed towards the microstructure bearing article is diffusely transmitted rather than being transmitted with its original collimation through the article. Thus, a greater haze value is calculated for the microstructure bearing article.

The microstructure is preferably abraded with falling sand according to a modified ASTM D-968-81 procedure. ASTM D-968-81 has been modified so that 200 milliliters of sand are used, rather than the 2000 milliliters of sand set forth in ASTM procedure. It has been found that the smaller quantity of sand provides sufficient abrasion of the microstructure while not excessively abrading the microstructure so that differing degrees of abrasion resistance can readily be determined.

The extent of the abrasion of the microstructure is preferably calculated by comparing the haze of the microstructure bearing article before abrasion to the haze of the microstructure bearing article after abrasion. The haze of the microstructure bearing article is preferably determined using a GARDNER Brand Model PG-5500 Hazemeter, which can be obtained from BYK-Gardner, Inc. of Silver Spring, Md.

When measuring the haze of a brightness enhancement film, the microstructure is preferably oriented with the grooves vertical and away from the light. The light transmitted and diffused by the microstructure bearing article are measured. The haze value for the microstructure bearing structure is then calculated by dividing the light diffused value by the light transmitted value.

The change from good to bad scratch resistance qualities is gradual and difficult to quantify. However, it has been found that when the abrasion causes the haze value to increase by less than or equal to about 60 percent and more preferably less than about 40 percent, the microstructure bearing article exhibits excellent scratch resistance characteristics. It has also been found that when the abrasion causes the haze value to increase by more than 64 percent, the microstructure does not exhibit desirable scratch resistance characteristics.

The microstructure bearing articles of the present invention are described with reference to the following examples. These examples are provided as an illustration of the invention and are not intended to limit the invention.

EXAMPLES

The following brightness enhancement films were produced to examine the scratch resistance characteristics of films produced according to the present invention. While all of the scratch resistance characteristics were measured for brightness enhancement films, it is believed that the process followed and materials used would produce similar results when used to construct and test optical lighting films.

The first two samples were similar to prior art brightness enhancement films. These samples provide a basis to compare the results obtained by the brightness enhancement films produced according to the present invention. A brominated resin brightness enhancement film sample was prepared from a composition having about 60 percent RDX 51027 (UCB-Radcure of Smyrna, Ga.) about 40 percent PHOTOMER Brand 4035, (Henkel Corporation of Ambler, Pa.) and about 1 percent DAROCUR Brand 1173.

The composition was then coated onto a master, carrying a brightness enhancement film pattern with adjacent peaks spaced 0.05 millimeters apart, in an amount that was barely sufficient to fill the cavities using a lab knife coater. The cavities of the master were then filled by moving the composition between a polycarbonate substrate and the master to form a microstructure bearing article. A distance between the tips on the master and the substrate was maintained less than approximately 0.005 millimeters. The composition that forms the microstructure was then cured with ultraviolet radiation.

An abrasion resistance test was then performed on the brightness enhancement film following the ASTM D-968-81 procedure. The only modification to the ASTM procedure was that only 200 milliliters of sand was used. The smaller volume of sand provided sufficient abrading of the brightness enhancement film to readily differentiate the abrasion resistance qualities of the film. After abrasion resistance testing, the haze of the brightness enhancement film was determined using a Gardner PG-5500 Hazemeter.

The results of the abrasion resistance testing are illustrated in Table 1. Both flat films (without a microstructured surface) and films with a microstructured surface were tested. The brominated resin brightness enhancement film exhibited a change in haze from before abrading to after abrading of 77 percent. Because this value is much greater than 60 percent, the brominated resin brightness enhancement film does not exhibit satisfactory scratch resistance characteristics.

TABLE 1

SCRATCH RESISTANCE TESTING

|  | Haze before Abrading | Haze after Abrading | Change in Haze |
|---|---|---|---|
| Films With Microstructured Surface | | | |
| Brominated Resin | 7% | 84% | 77% |
| Unbrominated Resin | 10% | 74% | 64% |
| P3-820 | 3% | 63% | 60% |
| P3-880 | 77% | 92% | 15% |
| P3-900 | 4% | 61% | 57% |
| P3-905 | 3% | 60% | 57% |
| LP-3 | 8% | 72% | 64% |
| LP-33 | 12% | 71% | 59% |
| ZL-1866 | 5% | 63% | 58% |
| 6010/IOA | 6% | 32% | 26% |
| Resin A | 10% | 44% | 34% |
| Flat Films | | | |
| Brominated Resin | 1.6% | 48.8% | 47.2% |
| Resin B | 0.1% | 36.2% | 36.1% |
| P3-905 | 1.1% | 30.9% | 29.8% |
| 6010/IOA | 2.2% | 25.8% | 23.6% |
| MELLINEX Polyester | 1.0% | 62.4% | 61.4% |

An unbrominated resin brightness enhancement film was then prepared from a composition having about 60 percent PHOTOMER Brand 3016, about 40 percent PHOTOMER Brand 4035, and about 1 percent DAROCUR Brand 1173. Similar to the brominated resin, the unbrominated resin was formed into a microstructure, cured, and then abrasion resistance tested. The unbrominated resin exhibited a haze increase of 64 percent. While this increase was smaller than the increase for the brominated resin, the haze increase was still greater than 60 percent, which is the threshold for a satisfactory abrasion resistance rating.

A series of brightness enhancement films were prepared using materials derived from polythioethers marketed under the "PERMAPOL" designation. These samples are reported in Table 1 under the designations P3-820, P3-880, P3-900, and P3-905. The P3-820, P3-880, P3-900, and P3-905 materials were obtained from Products Research & Chemical Corporation of Glendale, Calif.

For each oligomer, the polythioether was mixed with azlactone and diazabicycloundecene such that the polythioether was 68 percent by weight of the mixture, the aziactone was 30 percent by weight of the mixture, and the diazabicycloundecene was 2 percent by weight of the mixture. The mixture was maintained at a temperature of 65° C. using an oil bath until the aziactone was completely reacted to form a reacted polythioether. The reacted polythioether was then mixed with PHOTOMER Brand 4028 in a ratio of approximately one to one. To enable curing of the microstructure by ultraviolet radiation, DAROCUR Brand 1173 was used as a photoinitiator at about 1 percent by weight of the mixture.

After the components were homogeneously mixed, the mixture was formed into a microstructure, cured, and then abrasion tested similar to the brominated resin brightness enhancement film. The "PERMAPOL" Brand films all exhibited haze increases of less than or equal to 60 percent. These values are within the maximum acceptable haze increase of 60 percent. However, the film designated as P3-880 is probably not acceptable for use as a brightness enhancement film because the initial haze of 77 percent is too great for the film to display desired optical properties. Except for the P3-880 film, the "PERMAPOL" Brand films are suitable for use as brightness enhancement films and exhibit excellent scratch resistance characteristics.

Brightness enhancement films were prepared from a group of liquid polysulfide oligomers and acrylated liquid polysulfide oligomers. These samples are reported in Table 1 under the designations LP-3, LP-33, and ZL-1866. The LP-3, LP-33, and ZL-1866 materials were obtained from Morton International of Chicago, Ill. These samples were prepared following the same procedure that was used to prepare the "PERMAPOL" films.

The microstructure bearing films were prepared, cured, and then abrasion tested using the same procedure that was used for the brominated resin. The LP-3 film displayed a haze increase of 64 percent, which is greater than the threshold for a satisfactory abrasion resistance rating. The LP-33 and ZL-1866 films, on the other hand, exhibited haze increases of 59 and 58 percent, respectively. These haze increase values indicate that these films displayed excellent abrasion resistance characteristics. These materials also indicate that a wide range of abrasion resistance values are exhibited by materials within a particular family of materials.

A brightness enhancement film that is identified as 6010/IOA in Table 1 was then prepared. The film was prepared from PHOTOMER Brand 6010 and iso-octyl acrylate. The PHOTOMER Brand 6010 was about approximately 80 percent by weight of the composition and the iso-octyl acrylate was about approximately 20 percent by weight with approximately 1 percent DAROCUR Brand 1173 of the composition.

The components were homogeneously mixed in the compound, formed into a microstructure, cured, and then abrasion tested similar to the brominated resin brightness enhancement film. The 6010/IOA film exhibited a haze increase of 26 percent. This haze increase was considerably less than the maximum acceptable haze increase of 60 percent. Thus, the 6010/IOA film exhibited excellent scratch resistance characteristics.

A brightness enhancement film that is identified as Resin A in Table 1 was then prepared. The film was prepared from an oligomer that is disclosed in Example 1 of U.S. Pat. No. 5,175,030, iso-octyl acrylate, N-vinyl caprolactam, hexandiol diacrylate, and a photoinitiator. The oligomer disclosed in Example 1 of U.S. Pat. No. 5,175,030 was about approximately 54 percent by weight of the composition. The iso-octyl acrylate was about approximately 15 percent by weight of the composition. The N-vinyl caprolactam was about approximately 15 percent by weight of the composition. The hexandiol diacrylate was about approximately 15 percent by weight of the composition. The photoinitiator was IRGACURE Brand 184, which can be obtained from Ciba-Geigy Corporation of Hawthorne, N.Y. The IRGACURE was about approximately 1 percent by weight of the composition.

The components were mixed homogeneously, formed into a microstructure, cured, and then abrasion tested similar to the brominated resin brightness enhancement film. The Resin A film exhibited a haze increase of 34 percent. This haze increase was considerably less than the maximum acceptable haze increase of 60 percent. Thus, the Resin A film exhibited advantageous scratch resistance characteristics.

The flat films listed in Table 1 were all coated on a polyethylene terephthalate substrate. Minimal acceptable haze increase for flat films is less than or equal to 30 percent. The flat films identified as brominated resin, P3-905 and 6010/IOA have the same resin compositions as their similarly identified microstructure film counterparts in Table 1. The flat film identified as Resin B includes a resin composition of 48 percent RDX 51027 (from UCB-Radcure), 32 percent Photomer 4035 (from Henkel Corporation), 20 percent EB-220 (from UCB-Radcure), with 1 percent D-1173 (from Ciba-Geigy) coated on the polyethylene terephthalate substrate. All of the flat film resin compositions were prepared, cured, and then abrasion tested using the same procedure that was used for the films having a microstructured surface.

Although the present invention has been described with reference to preferred embodiments, workers skilled in the art will recognize that changes may be made in form and detail without departing from the spirit and scope of the invention.

What is claimed is:

1. A computer comprising:

a light source, a display panel; and a film disposed between the light source and the display panel, the film having a base and a layer formed from a cured oligomeric resin composition disposed on the base, and wherein the layer exhibits a haze increase of less than or equal to 60 percent after the microstructure is abraded according to ASTM D-968-81 procedure using 200 milliliters of sand.

2. The computer of claim 1 wherein the layer comprises a microstructure of alternating tips and grooves.

3. The computer of claim 2 wherein the tips have an included angle in the approximate range of 70° to 120°.

4. The computer of claim 1 wherein the display panel is a liquid crystal display panel.

5. The computer of claim 1 wherein the layer of cured oligomeric resin composition exhibits an elongation at break of greater than 50 percent when the resin composition is evaluated according to ASTM D-882-91 procedure.

6. The computer of claim 1 wherein the layer of cured oligomeric resin composition forms a polymer having a tensile modulus of less than $6.8 \times 10^8$ pascals when evaluated according to ASTM D-882-91 procedure.

7. The computer of claim 1 wherein the base is selected from the group consisting of polyethylene terephthalate, polycarbonate, cellulose acetate butyrate, cellulose acetate propionate, polyether sulfone, polymethyl methacrylate, polyurethane, polyester, polyvinyl chloride, glass, or combinations thereof.

8. The computer of claim 1 wherein the crosslinkable oligomeric resin composition comprises at least one resin selected from the group consisting of acrylate or thioacrylate terminated polythioether oligomer, acrylated liquid polysulfide oligomer, polyether based urethane acrylate oligomer, polyester based urethane acrylate oligomer, iso-octyl acrylate, N-iso butoxymethyl methacrylamide, N-vinyl caprolactam, hexandiol diacrylate, or combinations thereof.

* * * * *